United States Patent Office 3,150,174
Patented Sept. 22, 1964

3,150,174
PROCESS FOR THE MANUFACTURE OF
L-LYSINE OR SALTS THEREOF
Johannes E. Nelemans, Geleen, and Albertus H. Pecasse,
Maastricht, Netherlands, assignors to Stamicarbon
N.V., Heerlen, Netherlands
No Drawing. Filed July 5, 1960, Ser. No. 40,525
Claims priority, application Netherlands, July 9, 1959,
241,136; May 18, 1960, 251,763
6 Claims. (Cl. 260—534)

This invention relates to the manufacture of L-lysine, and/or salts thereof. More particularly, this invention provides a novel process for the manufacture of L-lysine by hydrolysis of L-α-amino-ε-caprolactam.

It is known to convert L-α-amino-ε-caprolactam to L-lysine, or a salt thereof, by hydrolysis of the starting material with hydrochloric acid, reported at, for instance, Helv. Chim. Acta, XLI (1958), page 186, last paragraph.

This procedure involves heating one part by weight of the hydrochloride salt of L-α-amino-ε-caprolactam with 20 parts by weight of 6 N aqueous hydrochloric acid for two hours under reflux conditions. The resulting solution is then evaporated and successive amounts of water added to the residue and successively removed, in each instance, by repeated evaporations. After this treatment has been performed several times, the excess hydrogen chloride gas is effectively removed, and the L-lysine-dihydrochloride salt is ultimately obtained.

It will be appreciated from the foregoing brief description that this process has numerous disadvantages. These include, for instance, the fact that using a concentrated hydrochloric acid solution necessarily leads to severe corrosion problems, and makes great demands on the apparatus. Secondly, the removal of the large excess of hydrogen chloride from the solution is a laborious operation necessarily requiring considerable amounts of time. Thirdly, the process yields directly only the lysine-dihydrochloride salt, which is not generally acceptable for use in foodstuffs owing to the high chlorine contents thereof. When it is desired to use the L-lysine as a food additive, it is first necessary to convert the dihydrochloride salt to the monohydrochloride salt.

Because of these various disadvantages attaching to prior art techniques for the production of L-lysine and/or salts thereof, a search has been made for an improved process.

Attempts have been made, for instance, to hydrolyse L-α-amino-ε-caprolactam by means of weak bases, such as ammonia and calcium hydroxide. These techniques have, however, yielded disappointing results. Using ammonia, the hydrolysis reaction was encumbered with the production of various undesirable by-products while the calcium hydroxide or calcium oxide hydrolysis induce racemization with loss of optical purity in the product. These results made it appear that necessarily some acid hydrolysis technique was necessary since the use of even stronger bases would be expected only to increase the production of either by-products or optically impure material.

For instance, the "Encyclopedia of Chemical Technology," volume 11, page 216, notes that the preparation of amino acids from proteins by hydrolysis with strong bases such as sodium hydroxide and barium hydroxide is not suitable since the amino acids formed are in some instances partly or completely decomposed, and invariably obtained only in a racemized form. The hydrolysis of L-α-amino-ε-caprolactam with a strong base to attempt to prepare the amino-acid lysine accordingly seemed most unattractive since it was only to be expected that the same phenomena would occur.

Surprisingly, it has now been found that L-lysine, and/or salts thereof, can be prepared in practically quantitative yields by hydrolysis of L-α-amino-ε-caprolactam, in aqueous solution, by treatment with a strong base.

It is therefore the principal object of this invention to provide a process for the production of L-lysine, and/or salts thereof, by hydrolysis of L-α-amino-ε-caprolactam, under aqueous strongly alkaline conditions. Other and further objects of this invention will be evident from the following description thereof.

As already indicated, this invention provides a process wherein a strong base is employed to achieve hydrolysis of L-α-amino-ε-caprolactam to substantially optically pure L-lysine, and/or salts thereof, in substantially quantitative yields. The object of any such process is, of course, eventually to obtain the product in a desirably pure form. Accordingly, it is preferred in the practice of this invention to employ those strong bases which are most readily separated from lysine. Moreover, since the L-lysine product is normally used as a supplement for animal and human diets, to increase the nutrient value thereof, it is also desired that the strong base be non-toxic. Suitable strong bases meeting all of these criteria are the alkali metal hydroxides, especially potassium hydroxide and sodium hydroxide.

The hydrolysis process of the present invention may suitably be carried out under atmospheric pressure. However, the specific pressure employed is not a critical factor. For instance, superatmospheric pressures are entirely operative and will permit the use of higher temperatures. Generally speaking, adequate temperatures may, however, be achieved under normal atmospheric pressure conditions and, consequently, no special advantages accrue from the use of elevated pressures. Thus, the hydrolysis reaction of the present invention may conveniently and operatively be carried out at temperatures within the range of from about room temperature to the atmospheric boiling point of the mixture. Since an aqueous solution is employed, this boiling point is about 100° C., it being generally slightly elevated thereabove, in accordance with Raoult's law as applied to solutions.

The hydrolysis reaction rate increases with temperature, and to achieve complete hydrolysis within short periods of time, it is preferable to operate at temperatures above 80° C. The entire reaction may be conducted within such a temperature range, with completely satisfactory results. On the other hand, the hazard of some racemization taking place, or the formation of undesired by-products may be increased by operation at high temperatures, and it is, therefore, a preferred method for operating this invention to carry out at least the initial phase of the hydrolysis reaction at a relatively low temperature and thereafter substantially completing the same at a higher temperature.

For instance, a method particularly suited for the practice of the process of this invention on an industrial scale involves hydrolysis of the L-α-amino-ε-caprolactam at a temperature below about 45° C. until at least about 80% of the lactam has been hydrolyzed to the lysine. Thereafter, the temperature of the reaction mixture is raised to a point within the range between 80° C. and the reflux temperature, to completely convert all of the lactam to the lysine.

In the practice of the invention, approximately one mole of the alkaline metal hydroxide should be used for each mole of starting material lactam. The rate of hydrolysis will increase with the amount of base, and it is, therefore, preferred that the base be used in excess, for instance, up to about 1.5 mole per mole L-α-amino-ε-caprolactam. Larger excesses may be used, but since excellent results are achieved with a 50% excess, this is all that is required.

After the hydrolysis reaction has gone to completion, the reaction mixture comprises an aqueous solution of the lysinate of the base used, in which any excess of base is also present in the free state. This free base may be conveniently removed from the reaction mixture by leading the solution over a cation exchange resin. Furthermore, by this procedure the lysinate itself is also converted into lysine. This is a particularly advantageous technique to employ when the lysinate is hygroscopic, as in the case with sodium lysinate.

Accordingly, this invention also includes the process of treating the hydrolysis reaction mixture with a cation exchange resin to free the mixture of free base and to convert the alkali metal lysinate salt to free lysine.

Since L-lysine is itself hygroscopic, it is advantageous to add a suitable acid or a suitable base to the aqueous lysine solution, issuing from the cation exchanger, so as to convert it into a non-hygroscopic compound. Suitable materials for this purpose include, for example, mineral acids such as hydrochloric acid and inorganic bases such as calcium hydroxide. The L-lysine monohydrochloride or the calcium lysinate thereby produced by this invention can subsequently be isolated from the aqueous solution by any suitable evaporation means.

This invention also includes the procedure of isolation of the lysine from the hydrolysis mixture directly as the hydrochloride salt by adding hydrochloric acid and subsequently recovering the lysine-hydrochloride salt from the reaction mixture.

Preferably, in this mode of operating the invention the hydrolysis is carried out with sodium hydroxide and the hydrochloric acid is used in equimolar quantity with the sum of the quantities of the lysine and of the base, whereas the so formed L-lysine-monohydrochloride is separated from the reaction mixture by fractional crystallization.

It is preferred in the practice of this invention that the initial aqueous solution of L-α-amino-ε-caprolactam has a concentration within the range of about 170 grams to about 450 grams thereof per liter of water, and similarly, that the alkali metal hydroxide be added thereto at a concentration within the range of 1.25 N to 4.5 N.

While not limited thereto, the following examples further illustrate the mode of operation of the present invention.

*Example 1*

To an aqueous solution of L-α-amino-ε-caprolactam (64 g. in 40 g. water) sodium hydroxide (22 g.; 10% excess) was added, after which the mixture was heated to its boiling temperature (about 100° C.) with vigorous stirring. The initially formed two layer system became homogeneous in a few minutes.

After about 4 minutes, hydrolysis of the amino caprolactam was about 90% complete. After 30 minutes, the hydrolysis was complete, and the amino caprolactam had been practically completely converted to sodium L-lysinate.

The solution was then led over a cation exchanger consisting of sulphonated styrene polymer in the H form, the same cation exchanger being commercially available under the name of "Dowex-50."

When the solution had passed the ion exchanger, hydrochloric acid (a mole per 1 mole of lysine) was added. Upon evaporation of the solution, optically pure L-lysine monohydrochloride was obtained.

*Example 2*

Sodium hydroxide (600 g., 15 moles) was added to a solution of L-α-amino-ε-caprolactam (1280 g., 10 moles; in water, 5100 g.). The mixture was heated to 40° C. and kept at this temperature for about 24 hours. At the end of this period 98% of the L-α-amino-ε-caprolactam had been hydrolyzed. Heating was then continued for 1 hour at boiling temperature (appr. 100° C.). After this period, hydrolysis was complete and substantially all of the aminocaprolactam had been converted to sodium L-lysinate.

Finally, concentrated hydrochloric acid solution containing a total amount of 912 g. (25 moles) of hydrogen chloride was added to the reaction mixture, and the L-lysine-monohydrochloride was isolated by fractional crystallization.

In these examples potassium hydroxide may be used in place of sodium hydroxide in equimolar quantity.

It will be seen from the foregoing description that the process of this invention unexpectedly produces optically pure L-lysine by hydrolysis with strong bases of L-α-amino-ε-caprolactam, and the salts of L-lysine such as mineral acid salts, especially hydrohalides, and basic metal salts, such as the calcium salt, may also be obtained.

While illustrated with reference to particular embodiments, the scope of the invention is limited only by the terms and spirit of the following claims.

We claim:

1. Process for the production of alkali metal salts of L-lysine which comprises forming a reaction mixture by hydrolyzing an aqueous solution of L-α-amino-ε-caprolactam with at least an equimolar quantity of an alkali metal hydroxide at a temperature within the range of from about room temperature up to about 45° C. until at least 80% of the caprolactam is hydrolyzed, and then completing the hydrolysis at a temperature between about 80° C. and the boiling point of the reaction mixture, to form a reaction mixture comprising an aqueous solution of the L-lysine alkali metal salt.

2. The process of claim 1 wherein said alkali metal is sodium.

3. Process for the production of L-lysine-monohydrochloride which comprises forming a reaction mixture by hydrolyzing an aqueous solution of L-α-amino-ε-caprolactam with at least an equimolar quantity of an alkali metal hydroxide at a temperature within the range of from about room temperature up to about 45° C. until at least 80% of the caprolactam is hydrolyzed, and then completing the hydrolysis at a temperature between about 80° C. and the boiling point of the reaction mixture to produce the L-lysine alkali metal salt, and then adding an equimolar quantity of hydrochloric acid to convert the L-lysine alkali metal salt to L-lysine-monohydrochloride.

4. The process of claim 3 wherein said alkali metal is sodium.

5. Process for the production of L-lysine which comprises forming a reaction mixture by hydrolyzing an aqueous solution of L-α-amino-ε-caprolactam with at least an equimolar quantity of an alkaline metal hydroxide at a temperature within the range of from about room temperature up to about 45° C. until at least 80% of the caprolactam is hydrolyzed, and then completing the hydrolysis at a temperature between about 80° C. and the boiling point of the reaction mixture to form a reaction mixture comprising an aqueous solution of the L-lysine alkali metal salt, and subsequently leading the so formed aqueous solution of the L-lysine alkaline metal salt over a cation exchanger to form free L-lysine.

6. The process of claim 5 wherein said alkali metal is sodium.

References Cited in the file of this patent

UNITED STATES PATENTS

| | | |
|---|---|---|
| 2,876,218 | Francis et al. | Mar. 3, 1959 |
| 2,955,109 | Brenner et al. | Oct. 4, 1960 |

OTHER REFERENCES

Fischer, Berichte, vol. 33, page 2370 (1900).
Siegfried, Z. physiol. Chem., vol 43, page 363 (1904).
Fieser et al., "Organic Chemistry" (1950), page 257.
Greenberg, Amino Acids and Proteins, pages 60–62 (1951).